United States Patent [19]

Kähkipuro

[11] Patent Number: 4,804,067
[45] Date of Patent: Feb. 14, 1989

[54] INVERTER CONTROL APPARATUS FOR ELEVATOR MOTOR

[76] Inventor: Matti Kähkipuro, Kauppalankatu 3, 05800 Hyvinkää, Finland

[21] Appl. No.: 26,028

[22] Filed: Mar. 16, 1987

[30] Foreign Application Priority Data

Mar. 19, 1986 [FI] Finland ................... 861146

[51] Int. Cl.⁴ .............................. B66B 1/30
[52] U.S. Cl. ..................... 187/119; 318/808
[58] Field of Search .......... 187/119; 318/807, 808, 318/810, 811

[56] References Cited

U.S. PATENT DOCUMENTS

| | | | |
|---|---|---|---|
| 4,348,627 | 9/1982 | Fulton | 318/807 |
| 4,524,310 | 6/1985 | Nagase et al. | 318/808 |
| 4,544,873 | 10/1985 | Salihi et al. | 318/811 X |
| 4,602,701 | 7/1986 | Tanahashi | 187/119 |
| 4,625,834 | 12/1986 | Tanahashi | 187/119 |
| 4,678,063 | 7/1987 | Kitaoka et al. | 187/119 |

*Primary Examiner*—William M. Shoop, Jr.
*Assistant Examiner*—W. E. Duncanson, Jr.

[57] ABSTRACT

An apparatus for controlling a three-phase inverter supplying the a.c. motor of an elevator, the inverter having a power stage implemented with semiconductor switches, and the apparatus comprising an electronic control unit for producing a velocity reference value and a tachometer generator for producing an actual velocity value, voltage measuring elements for measuring a.c. voltages at the inverter output, and pulse width modulators and drivers for controlling the semiconductor switches in the inverter's power stage with control signals derived from the pulse width modulators. With the apparatus of the invention, fast control of the control voltage is achieved. Moreover, simpler voltage measuring elements may be used instead of current measuring elements. The apparatus of the invention comprises a speed regulator for producing a rotor current frequency and the frequencies of first reference voltages from the actual velocity value and the velocity reference value, a curve calculator for producing the amplitude of the reference voltages from the rotor current frequency and the frequency of the reference voltages, a three-phase oscillator for producing second reference voltages from the frequency and amplitude of the first reference voltages, and voltage regulators for producing control voltages for the pulse width modulators from additional reference voltages obtained from the second reference voltages and the actual value voltages obtained at the inverter output.

10 Claims, 5 Drawing Sheets

INVERTER CONTROL APPARATUS FOR ELEVATOR MOTOR

FIELD OF THE INVENTION

The present invention relates to an apparatus for controlling a three-phase inverter supplying the a.c. motor of an elevator, the inverter having a power stage implemented with semiconductor switches, and the apparatus comprising a electronic control unit for producing a velocity reference, and a tachometer generator for producing the actual value of velocity, voltage measuring elements for measuring the phase voltages at the inverter output, pulse width modulators, and drivers for driving the semiconductor switches of the inverter power stage using control signals obtained from the pulse width modulators.

BACKGROUND OF THE INVENTION

The frequency-controlled a.c. motor is the most advanced design, for instance for elevator motor drives. With frequency control the efficiency is high at all motor speeds, and the mains power factor is nearly unity. Frequency control is applicable in elevators with, as well as without, gear transmissions and at any speed. In addition, a simple and moderately priced short-circuit motor can be used. In elevator use, a transistor inverter implemented with transistors is best suited for frequency control since with transistors the highest switching frequency, among present power electronics components, is achieved. Also GTO thyristors are conceivable since their switching times are approximately of equal length, but because of the switch protection the main current circuit will be more complicated than with transistors.

Experience has revealed that a good strategy for controlling a short-circuit motor is to keep the magnetic flux constant. The magnetic flux is in general associated with slow response. If the magnetic flux changes, a time constant is introduced in the system. Stabilizing the magnetic flux can be achieved by keeping constant the magnetic flux of the stator, rotor or air gap. It is most advantageous to keep the magnetic flux of the stator constant since in that case the risk of the components of the magnetic circuit of the motor becoming saturated is least.

In present-day inverter technology, current feedback is employed for improving the curve shape, in which the phase currents obtained from the inverter output are measured. A negative feature of current feedback is slow response. This is due to the fact that in current feedback the inductances of the motor give rise to time constants. The control loop is usually the slower the greater the number of time constants. Moreover, current measuring elements are expensive because they are required to be able to measure direct current as well.

If pulse width modulation is effected in the inverter with the aid of a comparator as sinusoidal and triangular voltage comparison without feedback, the current supplied to the motor by the inverter is not sufficiently sinusoidal for instance in elevator use because in the rectified intermediate voltage circuit, from which the three-phase alternative voltage supplying the motor is obtained by rectifying with the inverter, the voltage is not constant, and because the semiconductor switch does not follow its driver without delay. A third factor causing error is the differential voltage which is caused by the residual voltage across the power electronics component, compared with the voltage appearing with the other direction of current, when the diode in parallel with the semiconductor switch is conductive. In practice, these errors cause vibration of the motor, which e.g. in elevator use impairs the performance of the elevator and causes passenger discomfort.

BRIEF SUMMARY OF THE INVENTION

It is accordingly an object of the present invention to eliminate or mitigate at least some of the above-mentioned drawbacks.

The present invention provides apparatus for controlling a three-phase inverter supplying the a.c. motor of an elevator, the inverter having a power stage implemented using semiconductor switches, and the apparatus comprising electronic control means for producing a velocity reference value, tachometer generator means for producing an actual velocity value, voltage measuring means for measuring phase voltages at the inverter output, pulse width modulator means and controller means for controlling semiconductor switches in the inverter power stage by control signals obtained from the pulse width modulator means, speed regulator means for forming the frequency of the rotor current and the frequency of the reference input voltages from the actual velocity value and from the velocity reference value, curve calculator means for forming the amplitude of the reference voltages from the rotor current frequency and from the frequency of the reference input voltages, three-phase oscillator means for forming additional reference voltages from the frequency and the amplitude of the reference input voltages, and voltage regulator means for producing control voltages for controlling the pulse width modulator means from the additional reference voltages and from the actual value voltages obtained from the output of the inverter.

In a preferred embodiment of the apparatus according to the present invention, the speed regulator means comprise a differential unit for forming the difference of actual value and velocity reference, a P controller and an I controller for controlling the difference between actual velocity value and reference value, a summing unit for combining the output signals from the P controller and the I controller with the velocity reference value to form the rotor current frequency, and a summing unit for forming the frequency of the reference voltages from the rotor current frequency and the velocity reference value.

The curve calculator means comprise, for forming the amplitude of the reference voltages with the aid of constant flux curves representing the motor, with the exception of low frequencies of the inverter reference voltages, a summing unit for combining a correction component proportional to the rotor current frequency with the frequency of the reference voltages, an absolute value amplifier for forming the absolute value of the amplitude in the case of negative reference voltage frequencies, and a control unit for controlling the correction component dependent on the rotor current frequency, to the purpose of approximating the non-linear portion at said low frequencies with a horizontal portion, a summing unit for forming the horizontal part approximating the minimum of the curve at positive reference voltage frequencies, a summing unit for adding the minimum value of the basic curve to the amplitude value obtained from the summing unit at negative reference voltage frequencies, a control unit for controlling the correction component dependent on the rotor current frequency, and a control unit for controlling the minimum value of the basic curve and, for forming the amplitude in different parts of the curve, diodes and a diode threshold error correcting circuit.

The three-phase oscillator means comprise an absolute value unit for forming the absolute value of the frequency of the reference voltages, a voltage-controlled oscillator for producing a square wave having a frequency proportional to the frequency of the reference voltages, memory circuits for storing the curve shape of each reference voltage, digital/analog converters for transforming the reference voltages presented in digital form into analog voltages, an up-and-down counter for forming the address of the memory circuits, and a comparator for detecting the sign of the frequency of the reference voltages and thereby the direction of rotation of the motor.

The voltage regulator means comprise actual value voltage forming circuits for forming the actual value voltages from the voltages measured at the inverter output, and actual value forming circuits for forming the control voltages of the pulse width modulator from the actual value voltages and the reference voltages.

The actual value voltage forming circuit means is preferably implemented mainly by a summing unit combining the positive and negative voltages of a pulsating d.c. voltage full-wave rectified from the three-phase voltage, and a summing unit combining the voltage measured at the inverter output with the a.c. voltage obtained as described.

The control voltage forming circuit means is implemented mainly with a differential unit comparing the actual value voltage and the reference voltage, with an amplifier integrating said difference, and with a summing unit enabling the differential thus obtained to be superimposed on the reference value to become a control voltage taking into account the momentary state of the a.c. motor.

Each controller comprises a delay circuit to compensate for the switching delay of the semiconductor switch, and a semiconductor switch driver circuit provided with an optoisolator.

The inverter may be a transistor inverter in which the controlled semiconductor switches in the power stage are transistors, or a GTO thyristor inverter in which the controlled semiconductor switches in the power stage are GTO thyristors.

The speed regulator is fast, owing to the integrating controller. This is desirable in elevator applications because no velocity error can be tolerated. The curve calculator approximately implements the constant stator flux characteristic curves for the given stator flux, yet the accuracy is adequate for elevator driving. Moreover, the job of tuning the curve calculator is easier than the corresponding task in the case of a calculator which would implement the given curves exactly. Instead of the three-phase oscillator, for instance servotechnology may be used in the reference voltage forming process. However, motor drive component tests and research are better performable with the aid of the oscillator.

Since in the control of the inverter voltage regulators instead of current regulators is employed, the control is faster because voltage regulators are free from delay caused by inductive phenomena. Moreover, the use of expensive current-measuring components in the inverter output is avoided. The isolation of the inverter's power stage with the aid of an optoisolator efficiently prevents the access of interference from the main current path to the control circuits.

BRIEF DESCRIPTION OF THE DRAWINGS

Further objects, features and advantages of the invention will appear from the following description thereof taken with reference to the accompanying drawings, in which.

DESCRIPTION OF THE PREFERRED EMBODIMENT

Figure 1:
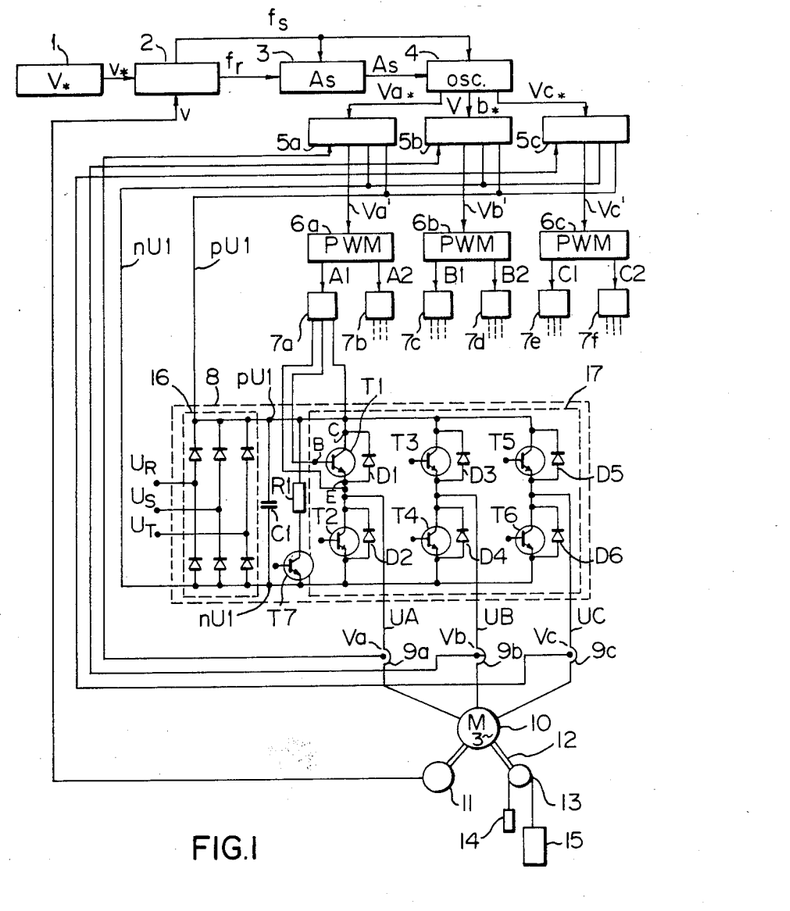
FIG. 1 present an elevator drive in which an a.c. motor is supplied by a frequency converter.

In the following, the operation of the apparatus according to the present invention is described by examining the elevator drive depicted in FIG. 1, in which an a.c. motor 10 is supplied by a frequency converter. The three-phase voltage supplying the power stage 8 of the frequency converter, the phase voltages of which are UR, US, and UT, is rectified by a rectifier 16, comprising e.g. diodes, to provide a d.c. voltage of an intermediate voltage circuit. The d.c. voltage of the intermediate voltage circuit is filtered using a capacitor C1. The power stage 17 consisting of the transistors T1-T6 and the power stage 17 consisting of the diodes D1-D6 invert the d.c. voltage of the intermediate circuit to become an a.c. voltage supplying the a.c. motor 10, the phase voltages of which are UA, UB and UC. The diodes D1-D6 are zero diodes constituting the current paths for inductive currents.

With the aid of a shaft 12, the a.c. motor 10 drives a traction sheave 13, moving a counterweight 14 and an elevator car is by means of lifting cables. For the return energy, in this instance a braking resistor R1 and a braking transistor T7 have been provided. The control of the braking transistor T7 is not described herein in this connection since it is an independent unit which operates when the d.c. voltage of the intermediate circuit rises over a preset limit.

The power stage 17 of the inverter is controlled by an apparatus according to the present invention which comprises a control electronics unit 1, a tachometer generator 11, pulse width modulators 6a-6c, voltage-measuring elements 9a-9c, a speed regulator 2, a curve family calculator 3, a three-phase oscillator 4, voltage regulators 5a-5c, and drivers 7a-7f for the semiconductor switches of the inverter power stage 17. The inputs of the speed regulator 2 are an actual value v of the speed of rotation of the motor and a velocity reference value v* obtained from the control electronics unit 1. The operation of the control electronics unit 1 for forming the velocity reference value v* represents technology with which those skilled in the art are familiar. The outputs of the speed regulator 2 are the frequency fs of the reference voltages and the frequency fr of the rotor current. The frequency fs of the reference voltages and the frequency fr of the rotor current are inputs for the curve family calculator 3, in which the amplitude As of the reference voltages is formed.

The frequency fs of the reference voltages is also applied, in addition to the amplitude As, to the three-phase oscillator 4, where the reference voltages Va*, Vb* and Vc* of the three phases are formed. From the reference voltages Va*, Vb* and Vc* and from the voltages Va, Vb, and Vc measured as feedback quantities at the voltage-measuring elements 9a, 9b, and 9c are obtained control voltages Va', Vb', and V' for the pulse width modulators 6a, 6b, and 6c in the voltage regulators 5a, 5b and 5c.

From the pulse width modulators 6a, 6b and 6c are obtained input signals A1, B1 and C1 of the transistor drivers 7a, 7c and 7e, which are provided with optoisolators and floating power sources, as well as control signals A2, B2, and C2 for the drivers 7b, 7d and 7f of the second transistor in each transistor phase, said control signals being the complementary to the control signals A1, B1, and C1. For instance, the control signal A2 is obtained as a signal complementary to the control signal A1, e.g. with the aid of a comparator. The design of the pulse width modulators 6a–6c represents technology very familiar to those skilled in the art, and their operation will therefore not be described in greater detail. The transistor drivers 7a–7f drive the transistors T1–T6 in the power stage 17 of the inverter.

Figure 2:
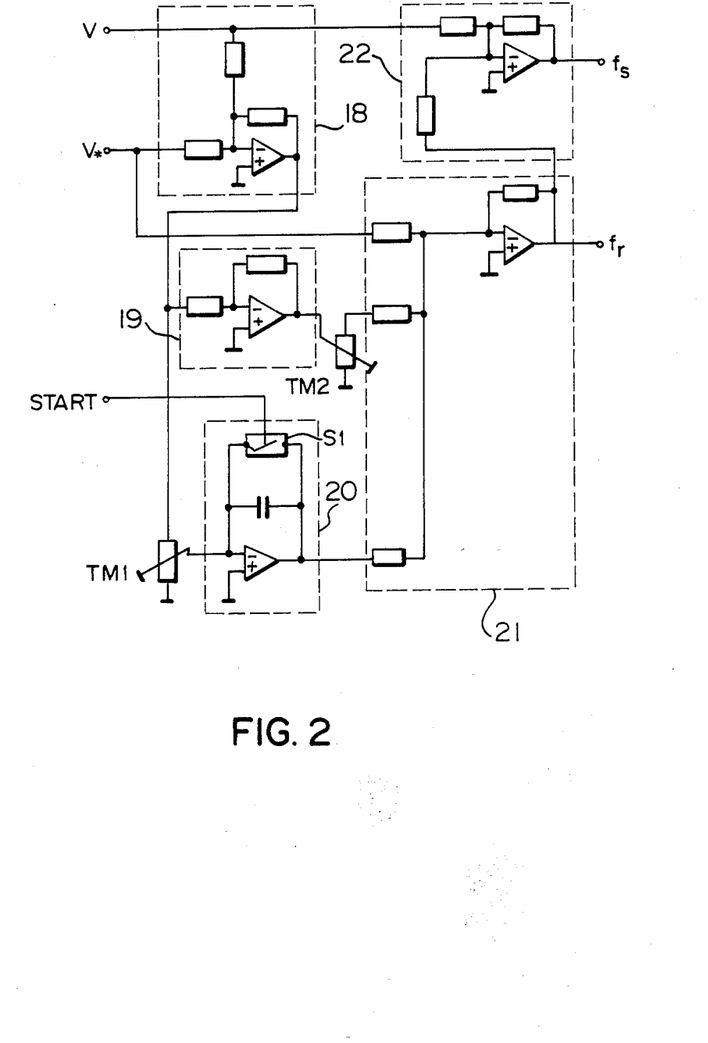
FIG. 2 presents a speed regulator embodying the invention.

In the following the apparatus of the invention is described in greater detail. The main characteristic features of the speed regulator 2 are shown in FIG. 2. the difference of the velocity reference value v* and the actual velocity value v is calculated in the differential unit 18. The differential signal is supplied to the inputs of the P (=proportional) controller 19 and of the I (=integrating) controller 20. The level of the differential signal is adjusted to be appropriate, using the potentiometer TM1, before supplying it to the I controller 20. The electronic switch S1 is needed in order that the I controller 20 can be set to its initial value when the elevator starts. The output signal of the P controller 19 is adjusted by means of the potentiometer TM2. The I and P control components are combined with the velocity reference V*, in the summing unit 21, which from the sum of these values forms the frequency fr of the rotor current. Since it is generally true that the frequency of the stator voltage is obtained by combining the product of the motor's rpm and the number of pole pairs with the frequency of the rotor current, the frequency fs of the reference voltages is obtained in the summing unit 22 by combining the actual velocity value v with the frequency fr of the rotor current.

Figure 3A:
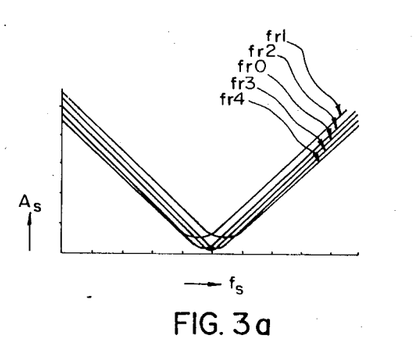
FIGS. 3a-3c present the operation and design of the curve family calculator according to the invention.

The method according to the present invention for forming the amplitude As of the inverter reference voltages is next explained by examining, to begin with, the constant flux curves describing the short-circuit motor, shown in FIG. 3a. The curves of FIG. 3a represent the amplitude As of the stator voltage of the motor, i.e., the amplitude As of the inverter's reference voltages, as a function of the frequency fs of the stator voltage of the motor, i.e., the inverter's reference voltages, at different rotor current frequencies fr0–fr4 when the magnetic flux of the stator is constant. At the value zero of the rotor current frequency fr the basic curve fr0 is obtained, its minimum being the minimum value of the amplitude of the control voltages. The substantially U-shaped curves of FIG. 3a are composed of linear parts constituted by the high positive and negative reference voltage frequencies, and of non-linear parts relating to low positive and negative frequencies fs.

Figure 3B:
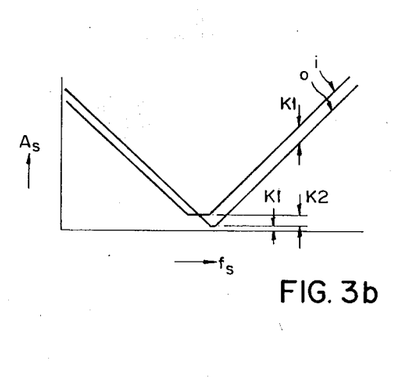

The curve calculator according to the present invention calculates the amplitude As of the inverter reference voltages using the linear approximation of the constant curve family presented in FIG. 3b. In FIG. 3b, the curve 0 is the approximation of the basic curve fr0 of FIG. 1. The minimum of the curve 0 is K0. This amplitude As applies when the rotor current frequency fr is zero. When the horizontal axis is interpreted so that negative frequencies fs of the reference voltages correspond to the other direction of rotation, then in order for the voltage to be correct also with negative frequencies fs the absolute value of the straight line must be taken. If to the curve 0 is added a correction component K1 proportional to the frequency fr of the rotor current and the absolute value is taken therefrom, the approximate value is obtained for the curves in FIG. 1, with the exception of low reference voltage frequencies fs.

At low reference voltage frequencies fs, the bottom height of the curves is proportional to the frequency fr of the rotor current augmented by the minimum value K0 of the basic curve. The entire approximative curve i is obtained by combining the curve of frequencies fs of reference voltages with a high absolute value with the curve of low frequencies fs of the reference voltages.

Figure 3C:
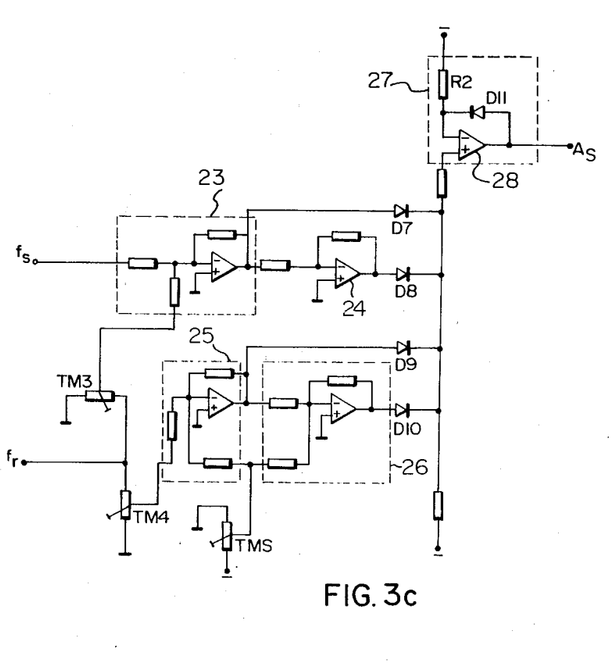

FIG. 3c shows the curve calculator accomplishing the linear approximation of the constant flux curves as shown in FIG. 3b. The inputs are the frequency fs of the stator voltages of the motor, i.e. of the inverter reference voltages, and the rotor current frequency fr. At frequencies fs of reference voltages with a high absolute value, the amplitude As of the reference voltages is obtained by combining the frequency fs of the reference voltages with the correction component K1 obtained from the rotor current frequency fr, and which can be regulated by a trimmer TM3 in the summing unit 23. The amplitude of the reference voltages thus obtained is applied, in the case of positive reference voltage frequencies fs, to the diode D7 and to the diode threshold error correcting circuit 27, from the output of which the amplitude As is obtained. Thereafter, the amplitude As is carried to the three-phase oscillator 4, where the inverter reference voltages can be formed. The diode threshold error correcting circuit 27 consists of an amplifier 28, a diode D11 and a resistor R2. At negative reference voltage frequencies fs, the amplitude is first carried to the absolute value amplifier 24, in which the negative amplitude becomes positive, and thereafter through the diode D8 to the diode threshold error correcting circuit 27.

At low reference voltage frequencies fs, the amplitude As of the reference voltages is formed by applying the correction component K2, formed from the rotor current frequency fr, first to a summing unit 25 in order to combine the correction component K2 with the minimum value K0 of the basic curve. At positive values of the rotor current frequencies fr, an amplitude is obtained from the amplifier which is composed of the sum of the correction component K2 and the minimum value K0, as shown in FIG. 3b. The amplitude As is carried through the diode D9 to the diode threshold error correcting circuit 27. At negative values of the rotor current frequency fr, the quantity obtained from the summing unit 25 is once again combined with the minimum value K0 of the basic curve, in the summing unit 26, the amplitude obtained from this being carried to the correcting circuit 27 through the diode D10 for forming the amplitude As. The correction component K2 produced from the rotor current frequency fr can be adjusted by means of a trimmer TM4. The minimum K0 of the basic curve can be adjusted by a trimmer TM5.

Figure 4:
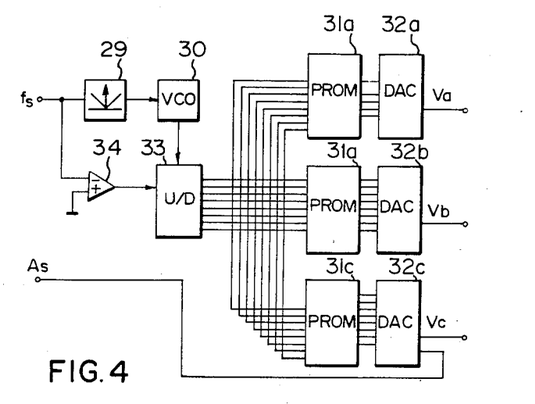
FIG. 4 presents a three-phase oscillator embodying the invention.

FIG. 4 illustrates a design for implementing the three-phase oscillator. Input quantities are the frequency fs of the reference voltages and the amplitude As. In an absolute value unit 29, the absolute value of the frequency fs of the reference voltage is formed, which thereafter is supplied to a voltage-controlled oscillator 30. The output of this oscillator is a square wave of which the frequency corresponds to the frequency fs of the reference voltages. The parallel-mode output of the up-and-down counter 33, of which the counting direction is determined by the comparator 34, and which uses for input the square wave from the oscillator 30, is used as address for three memories 31a–31c. The comparator 34 detects the sign of the frequency fs of the reference voltages and thereby the direction of rotation of the motor which is being controlled. In the memory circuits 31a–31c is stored the curve shape of each reference voltage with 120-degree phase differences, and hereby is obtained a symmetrical, digitally encoded three-phase system at the outputs of the memories 31a–31c. The digital words are carried to three identical digital/analog converters 32a–32c with the purpose of producing respective analog reference voltages Va*, Vb* and Vc*. Control of the amplitude of the voltages Va*, Vb* and Vc* is expediently accomplished at this stage through the reference inputs of the digital/analog converters 32a–32c with the aid of the amplitude instruction As coming from the curve calculator 3. The end results are thus three amplitude-and phase-controlled analog reference voltages Va*, Vb* and Vc*, which constitute a symmetric three-phase system.

Figure 5A:
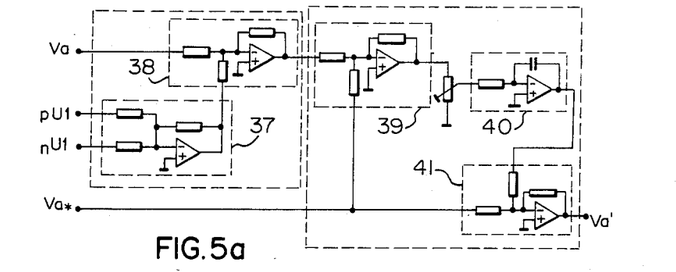
FIGS. 5a-5b present the operation and design of a voltage regulator according to the invention.
Figure 5B:
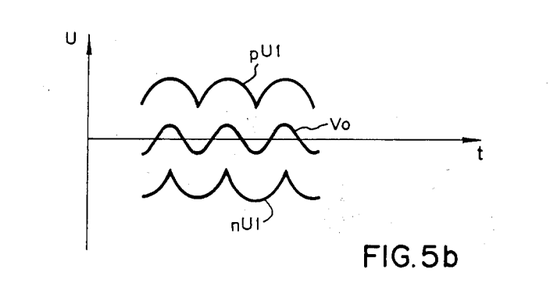

In FIGS. 5a and 5b there is presented the operation and design of a voltage regulator operating according to the superpositioning principle. The regulator of FIG. 5a is applicable in controlling the control voltage of one phase gong to the pulse width modulation in the inverter control apparatus of the invention. In the following, the operation of the voltage regulator of the invention is examined with the aid of FIGS. 5a and 5b, in the phase A. The inputs of the voltage regulator are the voltage Va, measured at the inverter output with the measuring element 9a, obtained as feedback, and the reference voltage Va*. The voltage regulator consists of an actual value voltage forming circuit 35 and a circuit 36 forming the control voltage Va' for the pulse width modulator. In the actual value voltage forming circuit 35, the summing unit 37 forms the synthetic zero level V0 of FIG. 5b. The synthetic zero level V0, which has a frequency three times the basic frequency, is obtained by combining the positive voltage pU1 and the negative voltage nU1 of the pulsating d.c. voltage across the capacitor C1, which has been full-wave rectified with the rectifier 16, to become the a.c. voltage V0. In the summing unit 38, the synthetic zero level a.c. voltage V0 is combined with the actual value voltage Va measured at the inverter output.

In the pulse width modulator control voltage forming circuit 36, the differential unit 39 forms the difference of the actual value voltage and the reference voltage Va*, this difference being controlled with the integrating amplifier 40. The gain of the amplifier 40 can be changed with the aid of a trimmer TM6. In the summing unit 41, the reference voltage Va* and the correction component formed from the difference between the reference voltage Va* and the actual value voltage are combined to constitute the control voltage Va' of the pulse width modulator 6a. As differential unit 39 there is provided a summing circuit of which one input is negative. The operation of the voltage regulators 5b and 5c in the other phases is similar to the operation of the voltage regulator 5a in phase A.

In this connection the influence of storage time has to be taken into account. That is, when the base current is removed from a transistor carrying current, the transistor will doncut during about another twenty microseconds. During that time the transistor operating as its pair must not be opened as otherwise a short-circuit would ensue. The transistor stops conducting only after the base charge has been dissipated. The transistor driver in the power stage, depicted in FIG. 6, consists of a delay circuit 42 and the driver circuit proper 43. The asymmetric delay in the transistor control is achieved with the aid of a hysteresis gate 44, to make sure that the other transistor of the transistor terminal, e.g. the transistor T2, will not start to conduct before the transistor T1 has ceased conducting. The switching delay is determined by the product of resistor R3 and capacitor C2. The diode D12 is required in order that switch-off might occur without delay. The input signal A is one of the driver input switches A1, A2, B1, B2, C1, or C2.

Figure 6:
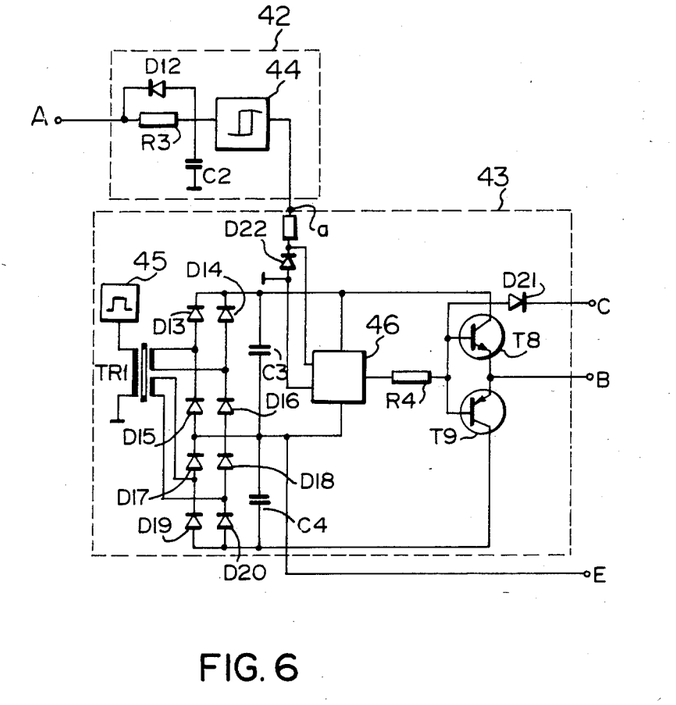
FIG. 6 presents the semiconductor switch driver embodying the present invention.

The driver circuit 43 has two floating power supplies. The negative supply is needed to provide a powerful negative base current for speeding up the switching-off. These two floating voltages are produced using rectifying diodes D13–D20 and filtering capacitors C3 and C4. As power supply of the driver circuit 43, there is utilized a high-frequency chopper current source 45, the secondary of whose transformer TR1 has a sufficient number of windings to cater for all floating current sources required. Energy is supplied from the transformer TR1. An optoisolator 46 supplies over a resistor R4 the end transistors T8 and T9 of the driver. These transistors constitute a dual-emitter follower circuit.

The diode D21 is a so-called Baker diode and prevents the power transistor proper from becoming saturated. This reduces and stabilizes the storage time. Furthermore, the switch-off power of the transistor will be less owing to this diode. The resistor R4 is needed for the Baker diode D21 to operate properly. The point O/E is the ground of the oscillator electronics. The diode D22 is the protective diode for the optoisolator 46. As output signals of the driver are obtained, for instance, the signals C, B and E driving the transistor T1.

It will be apparent to those skilled in the art that different embodiments of the invention are not exclusively confined to the above example, but may vary within the scope of the following claims. For example, in addition to a transistor inverter implemented with transistors, the apparatus of the invention may also be used in a GTO thyristor inverter implemented using GTO thyristors.

I claim:

1. An apparatus for controlling a three-phase inverter supplying the a.c. motor of an elevator;
   said inverter having a power stage implemented using semiconductor switches; and
   said apparatus comprising
   electronic control means (1) for producing a velocity reference value (v*);
   tachometer generator means (11) for producing an actual velocity value (v);

voltage measuring means (9a–9c) for measuring phase voltages at the inverter output;

pulse width modulator means (6a–6c) and controller means for controlling semiconductor switches in said inverter power stage by control signals (A1,A2,B1,B2,C1,C2) obtained from said pulse width modulator means (6a–6c);

speed regulator means for forming the frequency (fr) of the rotor current and the frequency (fs) of the reference input voltages from said actual velocity value (v) and from said velocity reference value (v*);

curve calculator means for forming the amplitude of the reference voltages from said rotor current frequency (fr) and from the frequency (fs) of said reference input voltages;

three-phase oscillator (4) means for forming additional reference voltages (Va*,Vb*,Vc*) from the frequency (fs) and the amplitude (As) of said reference input voltages; and voltage regulator means (5a–5c) for producing control voltages (Va',Vb',Vc') for controlling said pulse width modulator means (6a–6c) from said additional reference voltages (Va*,Vb*Vc*) and from the actual value voltages (Va,Vb,Vc) obtained from the output of said inverter.

2. Apparatus according to claim 1, wherein said speed regulator means comprise differential means (18) for forming the difference of the actual velocity value (v) and the velocity reference value (v*);

P controller means (19) and I controller means (20) for controlling the difference of the actual velocity value (v) and the velocity reference value (v*);

first summing means (21) for combining the output signals of said P controller means (19) and said I controller means (2) with the velocity reference value (v*) in order to produce the rotor current frequency (fr); and second summing means (22) for producing the frequency (fs) of the reference voltages from the rotor current frequency (fr) and the actual velocity value (v).

3. Apparatus according to claim 1, wherein said curve calculator means (3) comprise, means for producing the amplitude (As) of the reference voltages with the aid of constant flux curves representing the motor, except at low frequencies (fs) of the inverter's reference voltages;

first summing means (23) for combining frequency (fr) with the frequency (fs) of the reference voltages;

absolute value amplifier means (24) for producing the absolute value of the amplitude at negative frequencies (fr) of the reference voltages;

control means (TM3) for adjusting a correction component (K1) dependent on the rotor current frequency (fr);

for approximating the non-linear portion of the flux curve at said lower frequencies (fs) by a horizontal linear section:

second summing means (25) for producing the horizontal part approximating the minimum of the curve at positive frequencies (fs) of the reference voltages;

third summing means (26) for adding the minimum value (K0) of the basic curve to the amplitude value (A2) obtained from said second summing means (25) at negative frequencies (fs) of the reference voltages;

control means (TM4) for adjusting a correction component (K2) dependent on the rotor current frequency (fr); and control member (TM5) for adjusting the minimum value (K0) of the basic curve; and diode means (D7–D10), and a diode threshold error correcting circuit (27) for producing the amplitude (As) in different parts of the curves.

4. Apparatus according to claim 1, wherein said three-phase oscillator means comprise:

absolute value means (29) for producing the absolute value of the frequency (fs) of the reference voltages;

voltage-controlled oscillator means (30) for producing a square wave proportional to the frequency (fs) of the reference voltages;

memory circuits means (31a–31c) for storing the curve shape of each reference voltage;

digital/analog converter means (32a–32c) for converting the reference voltages in digital form to analog voltages (Va*,Vb*,Vc*);

up/down counter means (33) for producing the address of the memory circuits (31a–31c); and comparator means (34) for detecting the sign of the frequency (fs) of the reference voltages, and thereby the direction of rotation of the motor.

5. Apparatus according to claim 1, wherein said voltage regulator means (5a–5c) comprise an actual value voltage forming circuit means (35) for forming the actual value voltage from the voltage (Va) measured at the output of said inverter, and a control voltage forming circuit means (36) for forming the control voltage (Va') for the pulse width modulator from the actual value voltage and the reference voltage (Va*).

6. Apparatus according to claim 5, wherein said actual value voltage forming circuit means (35) comprise first summing means (37) for combining the positive voltage (pU1) and the negative voltage (nU1) of a pulsating d.c. voltage full-wave rectified from a three-phase voltage, and second summing means (38) for adding the voltage (Va) measured at the inverter output to an a.c. voltage (V0) thus obtained.

7. Apparatus according to claim 5, wherein said control voltage forming circuit means (36) comprise differential means (39) for comparing the actual value voltage with the reference voltage (Va*), to obtain a difference value amplifier means (40) for integrating said difference, and summing means (41) for superimposing a difference value then obtained on the reference value (Va*) to provide a control voltage (Va') representing the momentary state of the a.c. motor.

8. Apparatus according to claim 1, wherein said controller means (7a–7f) comprise delay circuit means (42) for compensating the switching delay of said semiconductor switches, and semiconductor switch driver circuits (43) provided with optoisolators (46).

9. Apparatus according to claim 1, wherein said inverter comprise a transistor inverter and said controlled semiconductor switches in said power stage (17) comprise transistors (T1–T6).

10. Apparatus according to claim 1, wherein said inverter comprise a GTO thyristor inverter and said controlled semiconductor switches in said power stage comprise GTO thyristors.

* * * * *